(No Model.)
W. J. ELLIOTT.
SPRING FRICTION JOINT.
No. 458,228.　　　　　　　　Patented Aug. 25, 1891.
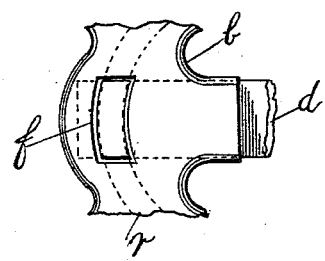
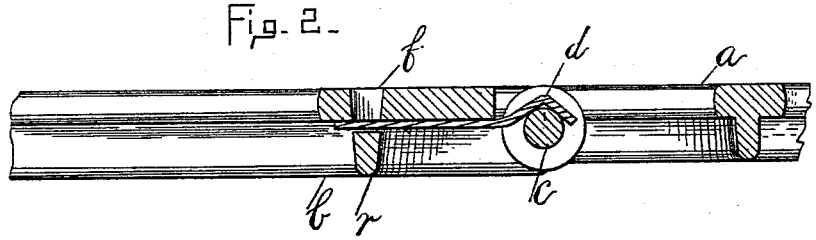
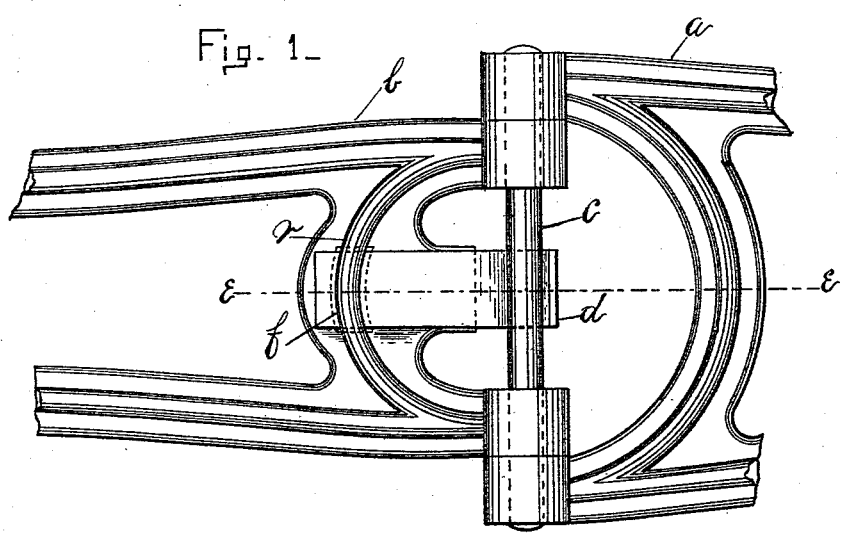
Witnesses:
R. P. Elliott.
C. G. Bartlett.
A. D. Harrison.
Inventor:
W. J. Elliott
by Knight Brown Knowsley
Attys.

UNITED STATES PATENT OFFICE.

WILLIAM J. ELLIOTT, OF MILFORD, NEW HAMPSHIRE, ASSIGNOR TO DAVID HEALD, OF SAME PLACE, AND CHARLES H. FRENCH, OF MALDEN, MASSACHUSETTS.

SPRING FRICTION-JOINT.

SPECIFICATION forming part of Letters Patent No. 458,228, dated August 25, 1891.

Application filed November 7, 1890. Serial No. 370,605. (No model.)

*To all whom it may concern:*

Be it known that I, WILLIAM J. ELLIOTT, of Milford, in the county of Hillsborough and State of New Hampshire, have invented certain new and useful Improvements in Spring Friction-Joints, of which the following is a specification.

This invention consists in a spring friction device or brake applied to one member of a jointed arm or hinge and bearing with a yielding pressure on the pivot that connects said members; and it has for its object to provide means whereby hinges or jointed arms may be prevented from swinging too freely at their meeting ends.

The invention is applicable to hinges for various purposes; but is to be applied more particularly to the jointed arms of adjustable mirror-supports, (shown in Letters Patent No. 434,659, granted to French and Heald, assignees of R. P. Elliott, August 19, 1890.

Of the accompanying drawings, forming a part of this specification, Figure 1 represents an elevation of portions of a jointed arm at the meeting ends of the sections thereof, showing the pivot and the preferred method of attaching my improved spring friction device or brake. Fig. 2 represents a cross-section through the line E E, Fig. 1. Fig. 3 represents a portion of the back of one of the members and the recess formed therein to receive the spring friction device or brake.

The same letters of reference indicate similar parts in the several views.

In the drawings, $a$ and $b$ represent portions of the meeting ends of two members of a hinge-jointed arm to which spring friction is to be applied.

$c$ represents the pivot connecting said members.

$d$ represents the spring friction device or brake engaged with a recess $f$, formed in the member $b$. Said brake is preferably a strip of steel inserted at one end in said recess and bearing at its other end with a yielding pressure on the pivot $c$, the strip being preferably bent, as shown in Fig. 2, to give it an extended bearing on said pivot.

The preferred method of putting together the parts above described is as follows: First insert the pivot in one side of the swinging arms, place one end of friction device or brake $d$ in recess $f$, bend the other end downward, then slide pivot into place and rivet down both ends of pivot, making it stationary in section $a$ and free to turn in section $b$, which necessitates the brake $d$ moving upon pivot $c$ and provides friction proportional to the strength of the brake $d$, whereby the members are prevented from swinging too freely at their meeting ends.

I prefer the above form of spring friction and method of retaining the same in position; but it is obvious that various other forms and methods may be used without departing from the spirit of my invention.

I claim—

1. In combination with a jointed arm or hinge composed of two parts or members connected by a hinge-joint, the pivot or pin of said hinge being immovable in one of said members, a spring friction device or brake attached at one end to one member and bearing at the other end with a yielding pressure upon the pivot which connects said members, as set forth.

2. The combination, in a jointed arm or hinge, of a member having a pivot-pin rigidly affixed to it, another member fitted to turn freely on said pin and provided with a socket, and a friction device or brake having one end inserted in said socket and bearing at its other end on the said pivot-pin, as set forth.

In testimony whereof I have signed my name to this specification, in the presence of two subscribing witnesses, this 22d day of October, A. D. 1890.

WILLIAM J. ELLIOTT.

Witnesses:
R. P. ELLIOTT,
C. J. H. AMBETH.